United States Patent

Kitajima et al.

[11] Patent Number: 5,506,927
[45] Date of Patent: Apr. 9, 1996

[54] FRAMEWORK FOR HOUSING OPTICAL EQUIPMENT HAVING OPTICAL FIBER CABLE

[75] Inventors: Yasuhiro Kitajima; Yasuhito Kitajima, both of Tokyo, Japan

[73] Assignee: NEC Corporation, Tokyo, Japan

[21] Appl. No.: 377,250

[22] Filed: Jan. 24, 1995

[51] Int. Cl.6 .................................................... G02B 6/42
[52] U.S. Cl. ......................... 385/135; 385/136; 385/137
[58] Field of Search ................................... 385/135–139, 385/88–90, 92; 174/250, 255, 260

[56] References Cited

U.S. PATENT DOCUMENTS

| | | | |
|---|---|---|---|
| 4,752,110 | 6/1988 | Blanchet et al. | 385/135 |
| 5,249,252 | 9/1993 | Noto | 385/135 |
| 5,329,067 | 7/1994 | Abe et al. | 385/135 X |
| 5,412,497 | 5/1995 | Kaetsu et al. | 385/135 X |

FOREIGN PATENT DOCUMENTS

| | | | |
|---|---|---|---|
| 61-55607 | 3/1986 | Japan | 385/135 |
| 1-102406 | 4/1989 | Japan | 385/135 |
| 3-148605 | 6/1991 | Japan . | |
| 3-228002 | 10/1991 | Japan | 385/135 |

*Primary Examiner*—Rodney B. Bovernick
*Assistant Examiner*—Hemang Sanghavi
*Attorney, Agent, or Firm*—Young & Thompson

[57] ABSTRACT

A surplus cable disposition board is mounted on a framework for housing an electro-optical equipment having an optical fiber cable, rotatably around a horizontal axis parallel to the front panel of the framework. In a stationary state, the disposition board is clamped at an angular position inclined inward from the surface of the front panel. On the back surface of the disposition board, cable saddles are fixed for holding the optical fiber cable.

6 Claims, 7 Drawing Sheets

FRAMEWORK FOR HOUSING OPTICAL EQUIPMENT HAVING OPTICAL FIBER CABLE

BACKGROUND OF THE INVENTION

This invention relates to a framework for housing optical equipment having optical fiber cable. In an optical communication equipment, there are at least one electro-optical circuit unit and an optical fiber cable. In connecting two communication sites by an optical fiber cable, a surplus length of the cable is usually left in either side of the two sites. The surplus length of the cable must be dexterously disposed in the framework for housing the optical communication equipment.

A prior art of a framework for housing optical equipment having a surplus cable disposition board is disclosed in a Japanese patent application entitled "Framework for housing optical equipment" which is laid open as a Provisional Publication No. 148605/'91. FIG. 7 and FIG. 8 are perspective views of the prior art. A framework 102 for housing optical communication equipment 101 houses electro-optical circuit units 103. An optical fiber cable 106 is connected to an electro-optical circuit unit 103 through an optical connector 105 and an adapter 104. A surplus length of the optical fiber cable is coiled and mounted on a surplus cable disposition board 107 and is lead out of the framework 102 leaving a slackened part in a heat radiating duct 108.

A guide slot 110 is provided in a side plate 109 of the framework 102. The guide slot 110 comprises a vertical upward guide slot 110a and a horizontal guide slot 110b. In the horizontal guide slot 110b, a vertical downward slot portion 110c is provided.

Side protuberances 107a and 107b are provided at a forward part and a backward part of a side of the surplus cable disposition board 107. These side protuberances are inserted in the guide slot 110 of the side plate 109 for supporting the surplus cable disposition board 107. In a stationary state of the surplus cable disposition board 107, the side protuberance 107b at the backward part is positioned at the top of the vertical upward guide slot 110a, and the side protuberance 107a at the forward part is positioned in the vertical downward slot portion 110c. Thus, the surplus cable disposition board 107 is fixed in a slanted position in which the upper side of the board 107 is lifted.

In a working state of the surplus cable disposition board 107, connectors 105 are disconnected from the adapters 104 as shown in FIG. 8, the protuberances 107a and 107b of the disposition board 107 are moved to the horizontal guide slot 110b, and the surplus cable disposition board 107 is drawn forward in a horizontal position.

The framework of the prior art shown in FIG. 7 and FIG. 8 requires an extra space for drawing forward the surplus cable disposition board 107. The surplus cable is exposed on the board 107 unprotected in the stationary state as well as in the working state. The cable is liable to a damage by an unexpected external force. It is troublesome to disconnect and connect the cable connectors 105 in changing between the stationary state and the working state.

Moreover, the framework of FIG. 7 has a poor frontal accessibility, since electrical connectors(not shown in the drawing) for connecting electric cables to the electronic circuit units are placed behind the surplus cable disposition board 107.

SUMMARY OF THE INVENTION

Therefore, an object of the present invention is to provide a framework for housing optical equipment with optical fiber cable, wherein optical connectors are left connected in a working state for disposing a surplus cable. Another object of the present invention is to protect the surplus cable from an unexpected external force in a stationary state. Still another object of the invention is to obtain an excellent frontal accessibility to the framework.

These objects are achieved by mounting a surplus cable disposition board to the framework rotatably around a horizontal axis parallel to the surface of a front panel of the framework. The disposition board of the present invention has two rest angles. In a stationary state, a front panel of the framework below the disposition board is closed, and the disposition board is positioned at a tilting angle to the vertical front surface of the framework, the back surface of the disposition board being stopped by stoppers and the front surface of the disposition board being pressed by gaskets attached to the front panel. In a working state, the front panel is opened releasing the pressing force of the gaskets. The disposition board can be easily rotated by hand to show the back surface where the surplus cable is disposed on cable saddles.

Thus, in the stationary state, a space behind the disposition board forms an air duct for air heated by electronic circuit units, and a space in front of the disposition board forms an air duct for fresh air inlet. And in the stationary state, the surplus cable is protected by the disposition board from unexpected external force. In a rotation of the disposition board, disconnection of optical connectors is not necessary, and accessibility to connectors and electronic circuit units is excellent when the lower front panel and the disposition board are opened.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
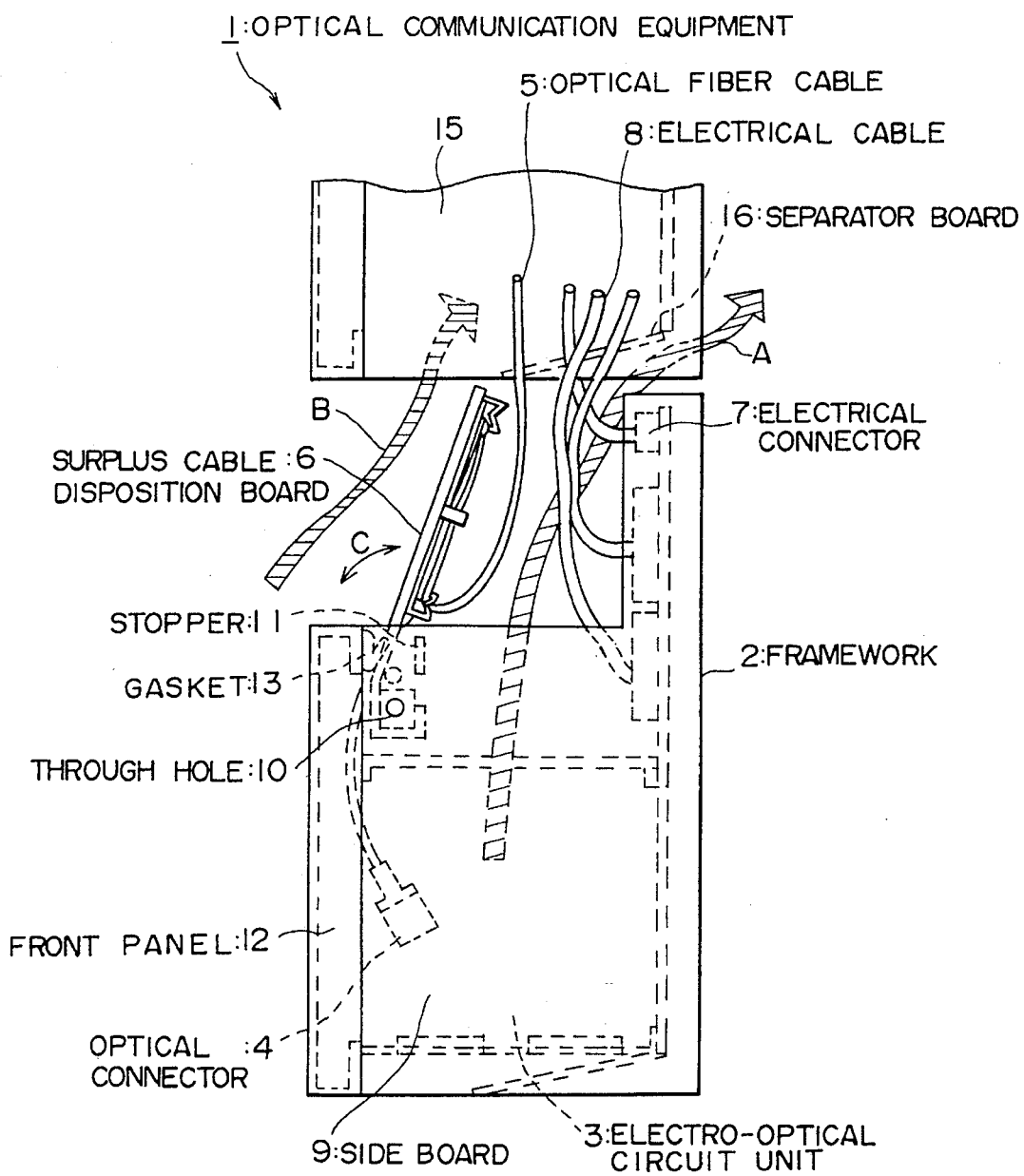
FIG. 1 shows a side view of an embodiment of this invention.

Referring to FIG. 1, a framework 2 of an optical communication equipment 1 houses an electro-optical circuit unit 8 which is connected to an optical fiber cable 5 through an optical connector 4. A surplus length of the optical fiber cable 5 is disposed on a surplus cable disposition board 6 mounted on the framework 2 in a space above the circuit unit 3. The disposition board 6 is held in a tilting angle to the vertical front surface of the framework, holding the surplus cable on the back surface(the right hand surface in the drawing) of the board 6.

In the space above the circuit unit 3, electronic circuit units with electrical connectors 7 are housed facing to the disposition board 6. Electrical cables 8 are connected to the electrical connectors 7.

A pair of through holes 10 is provided on both side plates 9 of the framework 2 at frontal positions above the circuit unit 3. The pair of holes 10 is for engaging a pair of balls in a pair of ball housings provided at both ends of the disposition board 6. Thus the disposition board 6 can be rotated around a virtual axis connecting the centers of the pair of balls as shown by an arrow C in the drawing.

A pair of L shaped stoppers 11 is fixed on both side plates at a position above the pair of holes 10. The rotation of the disposition board 6 is stopped at a tilting position where the back surface of the board 6 touches to the pair of the stoppers 11. At an upper inner surface of a lower front panel 12, a pair of gaskets 13 is fixed. This pair of gaskets 13 exerts a pressing force to the front surface of the board 6 when the lower front panel 12 is closed. Thus, the tilting position of the disposition board 6 is fixed by the pair of gaskets 13 and that of the stoppers 11. The state of this tilting position will be called a stationary state in this specification. A pair of embosses 14 (FIG. 2) is provided on both side boards 9 at a position above the pair of holes 10 to prevent the upward movement of the disposition board 6.

In the stationary state, the optical cable 5 and the electrical cables 8 are protected in a space between the disposition board 6 and the junction board for the electrical connectors 7.

A separator board 16 is fixed in the framework 2 above the junction board for electrical connectors. The disposition board 6 and the separator board 16 separates two air ducts in the framework 2. Heated air from the circuit unit 3 is exhausted under the separator board 16 as shown by an arrow A, and fresh air comes in along the front surface of the disposition board 6 as shown by an arrow B.

Figure 2:
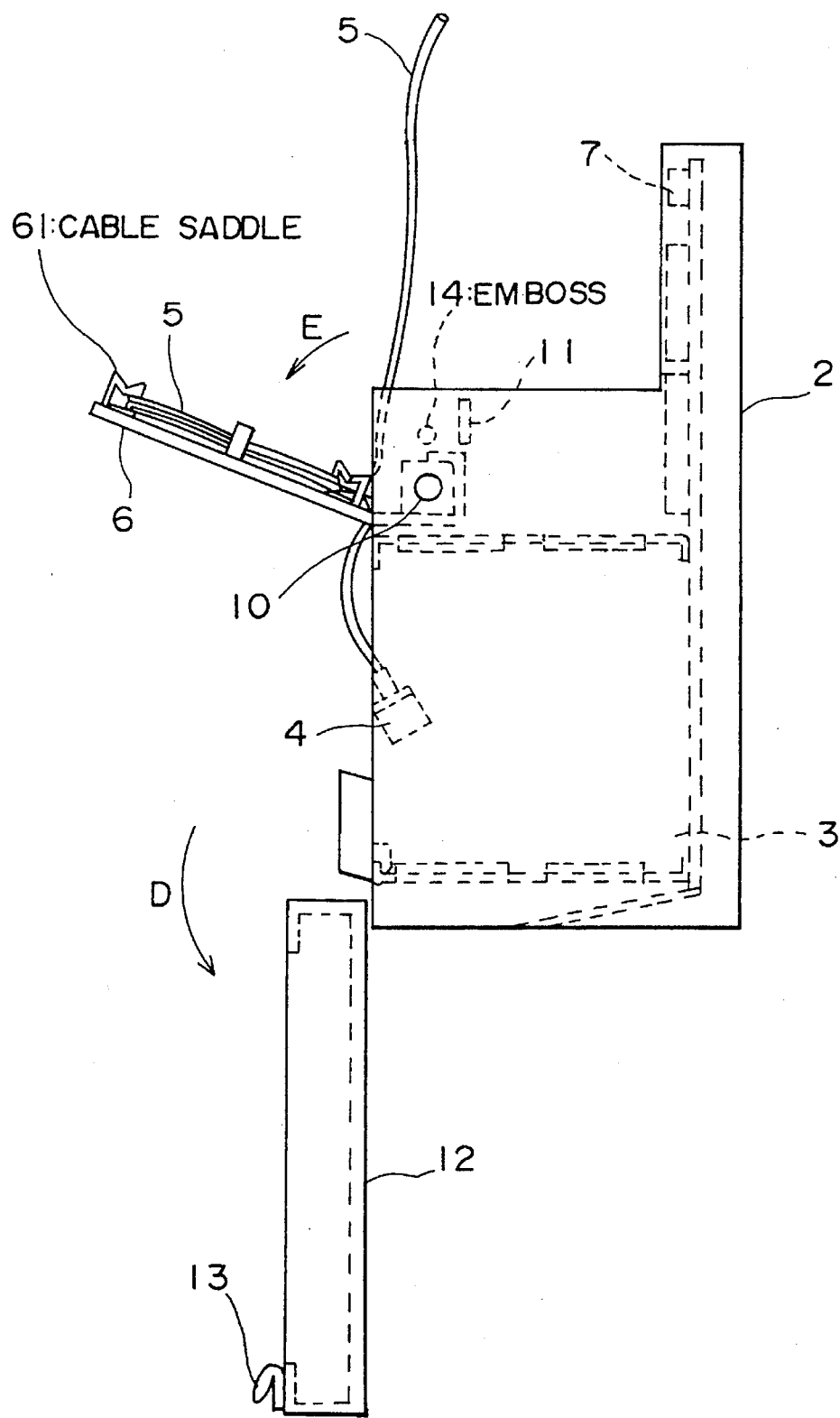
FIG. 2 shows a side view of an embodiment of this invention when a surplus cable disposition board is opened.

FIG. 2 shows the framework of FIG. 1 in a working state of the disposition board 6. The lower front panel 12 is opened in the direction shown by an arrow D in the drawing. The pressing force of the gaskets 13 is released. The disposition board 6 is rotated in a direction shown by an arrow E. In this rotation, the board 6 is rotated around a virtual axis connecting centers of the pair of balls 10, and the optical connector 4 can remain connected to the circuit unit 3. The surplus length of the optical fiber cable 5 is held by cable saddles 61 fixed to the backward surface of the board 6. In this working state, the surplus cable on the backward surface of the board 6 and electrical connectors 7 in the backward space of the board 6 can be easily accessed. When necessary the disposition board 6 can be removed.

Figure 3:
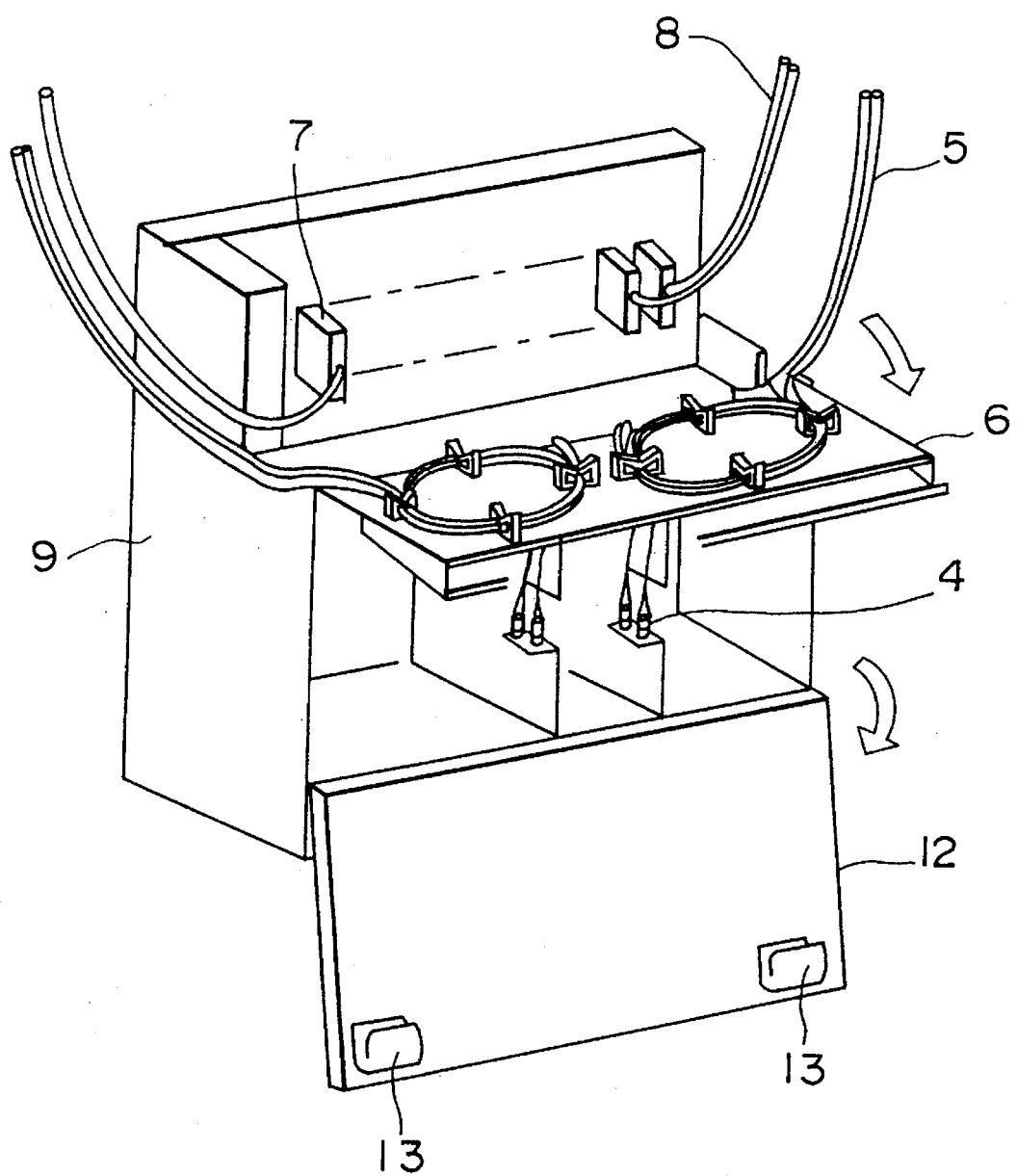
FIG. 3 shows a perspective view of an embodiment of this invention.
Figure 4:
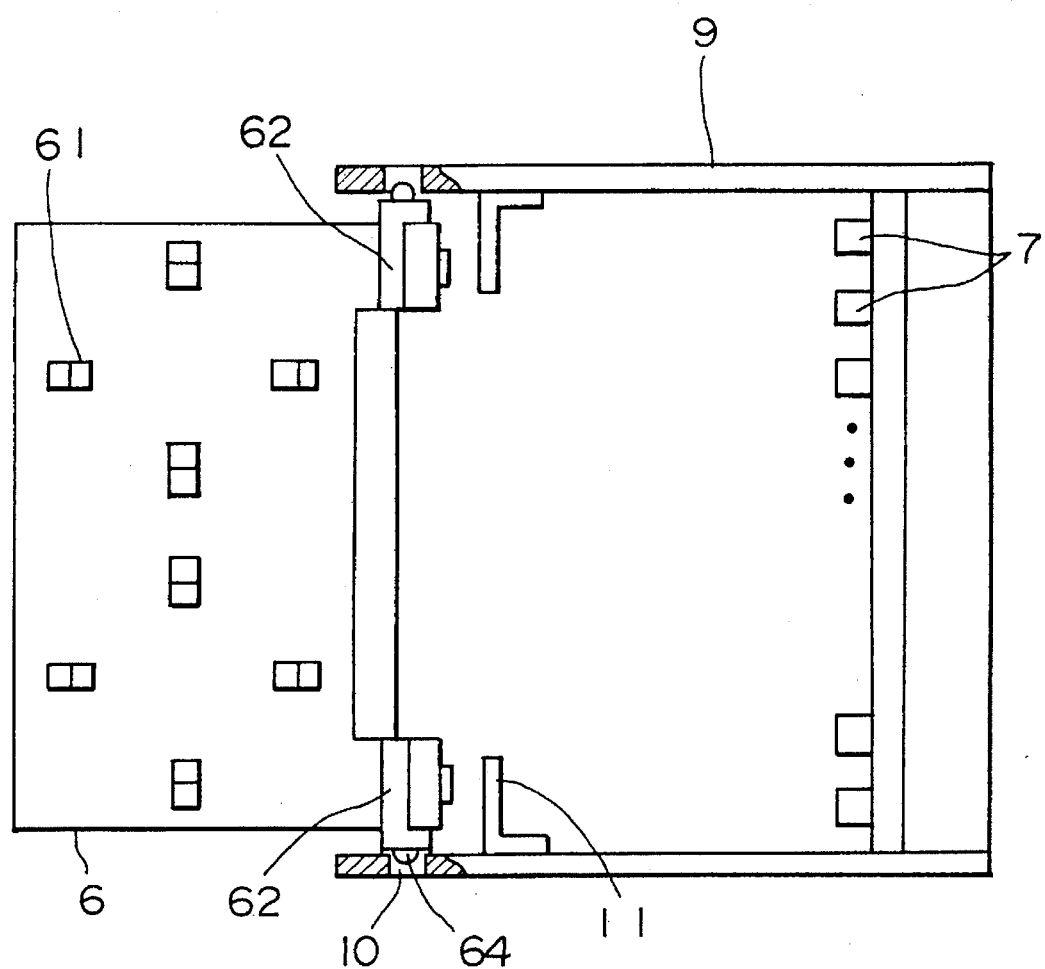
FIG. 4 shows a plan view of FIG. 2.
Figure 5:
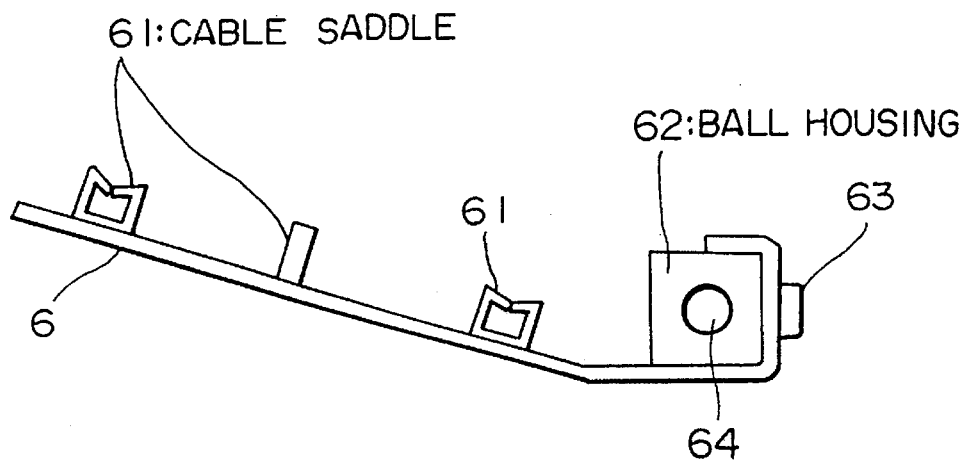
FIG. 5 shows a side view of a surplus cable disposition board of this invention.
Figure 8:
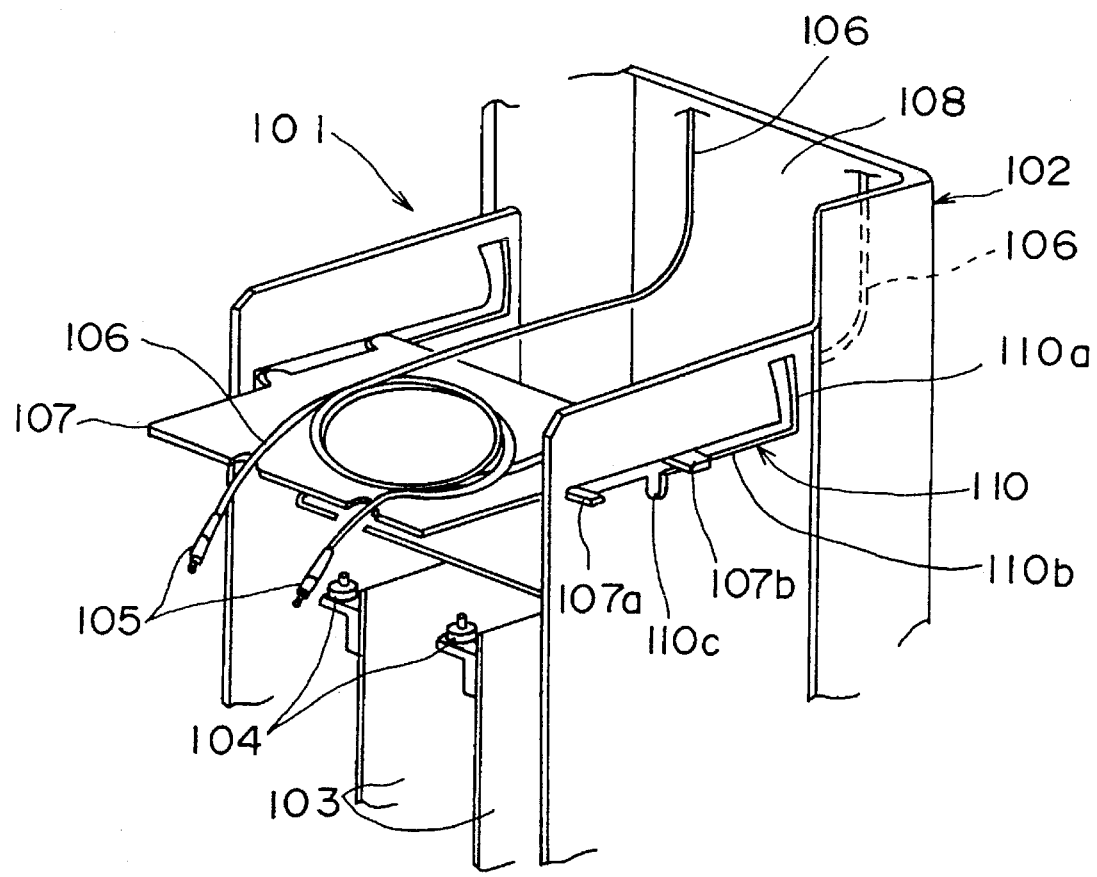
FIG. 8 shows a prior art of FIG. 7 in a working state.

FIG. 3 shows a perspective view of FIG. 2, and FIG. 4 shows a plan view of FIG. 2. FIG. 5 is a side view of the disposition board 6. In an embodiment shown in FIG. 4, two sets of four cable saddles 61 are arranged for holding a circular coil of the surplus cable in a set of four cable saddles. A cable saddle 61 is made of an elastic material and has M shaped crosssection, with an expandable opening on the concave top surface as shown in FIG. 8. The cable body is forced in the cable saddle 61 through the expandable opening and held in the cable saddle 61.

On either end of the lower side of the disposition board 6, a ball housing 62 is fixed by a screw 63 as shown in FIG. 4 and FIG. 5. At the tip of each ball housing 62, a ball 64 is detained. An elastic member(not shown in the drawing)in the ball housing 62 exerts an outward force to the ball 64, and an external force can push the ball 64 in the ball housing.

As shown in FIG. 4, the disposition board 6 is rotatably mounted on the side board 9 by inserting the ball 64 in a hole 10 provided in the side board 9. And the disposition board 6 can easily be removed from the side board 9.

Figure 6:
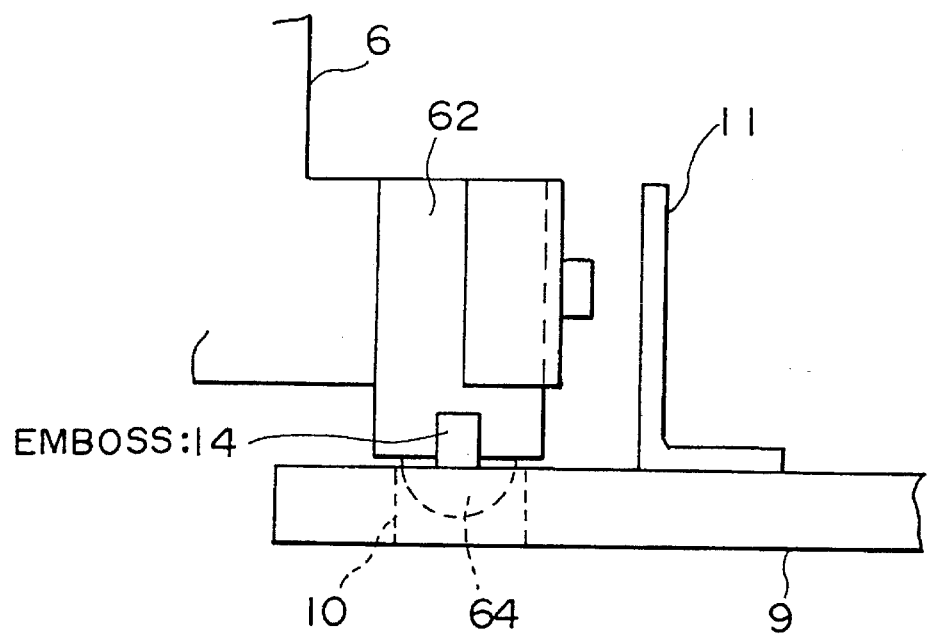
FIG. 6 shows an enlarged plan view of a part of FIG. 4.
Figure 7:
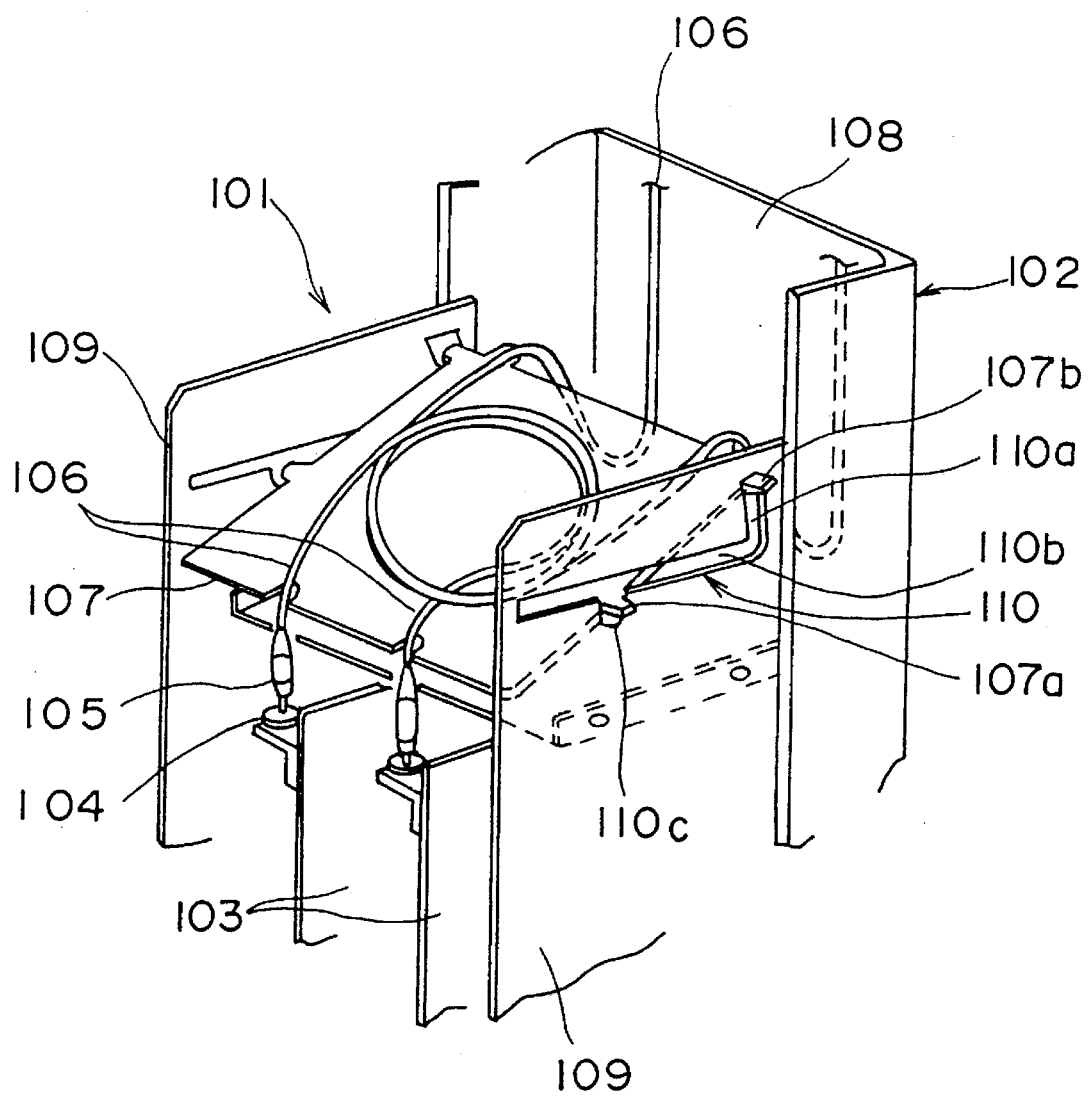
FIG. 7 shows a perspective view of a prior art.

As shown in FIG. 4 and FIG. 6, the rotation of the disposition board 6 is stopped by the L shaped stopper 11 fixed inside the side board 9. And an upward movement of the disposition board 6 is retained by the embosses 14 protruding inward from the side board 9. In the stationary state of the disposition board 6, the front surface of the board 6 is pressed by gaskets 13 provided on the front panel 12 as described in connection with FIG. 1.

Heretofore, this invention is described in connection with a preferred embodiment. But it must be understood that there are many variations and modifications without departing from the scope and spirit of this invention.

For example, in the preferred embodiment, an engagement between a ball and a hole is used for rotatably mounting a surplus cable disposition board on side boards of the framework. But it is apparent that any conventional hinge mechanism can be used for the purpose. And in the preferred embodiment, the rotatable disposition board is clamped at an angular position by stoppers and gaskets. But any conventional clamping mechanism can be used for the purpose.

What is claimed is:

1. A framework for housing at least one electro-optical circuit unit having optical fiber cable, comprising:

a surplus cable disposition board, surplus length of the optical cable being disposed on a back surface of said disposition board;

means for mounting said surplus cable disposition board at a front surface of the framework rotatably around a horizontal axis parallel to said surface of the framework;

means for clamping said surplus cable disposition board inclined inward at an angle to said front surface of the framework; and a separator board fixed to the framework spaced above said surplus cable disposition board in such a way as to separate two air ducts in the framework, one of said two air ducts exhausting air under said surplus cable disposition board and said separator board behind the framework, and the other of said two air ducts intaking air over said surplus cable disposition board and said separator board into an upper space in the framework.

2. A framework for housing at least one electro-optical circuit unit having optical fiber cable of claim 1, wherein said means for mounting said surplus cable disposition board comprises:

a ball housing provided at either end of a lower side of said surplus cable disposition board;

a ball held by said ball housing and urged outward; and a through hole provided in a side board of the framework for receiving said ball.

3. A framework for housing at least one electro-optical circuit unit having optical fiber cable of claim 1, wherein said surplus cable disposition board has a cable saddle on said back surface thereof, said cable saddle having a concave top surface with an expandable opening through which the optical fiber cable is forced into said cable saddle.

4. A framework for housing at least one electro-optical circuit unit having optical fiber cable, comprising:
- a surplus cable disposition board, surplus length of the optical cable being disposed on the back surface of said disposition board;
- means for mounting said surplus cable disposition board at a front surface of the framework rotatably around a horizontal axis parallel to said surface of the framework; and
- means for clamping said surplus cable disposition board inclined inward at an angle to said front surface of the framework, including a stop fixed to the framework in such a way as to limit rotation of said surplus cable disposition board at a predetermined angle to said front surface of the framework, and
- a gasket adhered to a back surface of a front panel of the framework for pressing against said surplus cable disposition board when said front panel is closed.

5. A framework for housing at least one electro-optical circuit unit having optical fiber cable of claim 4, wherein said means for mounting said surplus cable disposition board comprises:
- a ball housing provided at either end of a lower side of said surplus cable disposition board;
- a ball held by said ball housing and urged outward; and
- a through hole provided in a side board of the framework for receiving said ball.

6. A framework for housing at least one electro-optical circuit unit having optical fiber cable of claim 4, wherein said surplus cable disposition board has a cable saddle on said back surface thereof, said cable saddle having a concave top surface with an expandable opening through which the optical fiber cable is forced into said cable saddle.

* * * * *